US007891135B2

(12) United States Patent
 Laycock (10) Patent No.: US 7,891,135 B2
(45) Date of Patent: Feb. 22, 2011

(54) PLANTER

(76) Inventor: Larry R. Laycock, 146 S. Pfeifferhorn Dr., Alpine, UT (US) 84004

( * ) Notice: Subject to any disclaimer, the term of this patent is extended or adjusted under 35 U.S.C. 154(b) by 510 days.

(21) Appl. No.: 11/956,788

(22) Filed: Dec. 14, 2007

(65) Prior Publication Data

US 2008/0120902 A1   May 29, 2008

Related U.S. Application Data

(63) Continuation-in-part of application No. 11/510,387, filed on Aug. 25, 2006, now abandoned.

(51) Int. Cl.
  *A01G 9/02* (2006.01)
(52) U.S. Cl. ............................................. 47/68; 47/40
(58) Field of Classification Search .................. 47/39,
       47/40, 18, 65.5, 65.7, 66.1, 66.5, 66.6, 67,
       47/68, 79, 48.5, 62 R; D11/143, 156
  See application file for complete search history.

(56) References Cited

U.S. PATENT DOCUMENTS

| | | | |
|---|---|---|---|
| 4,419,843 A * | 12/1983 | Johnson, Sr. .................... | 47/82 |
| D313,374 S | 1/1991 | Hartley | |
| D322,418 S | 12/1991 | White | |
| 5,177,899 A | 1/1993 | Powell | |
| 5,181,621 A | 1/1993 | Plaehn | |
| D353,923 S | 12/1994 | Drake | |
| D448,321 S * | 9/2001 | Jones et al. ................ | D11/156 |
| D460,718 S | 7/2002 | Beattie | |
| 2003/0154652 A1* | 8/2003 | Dramm et al. ............... | 47/48.5 |
| 2005/0039390 A1* | 2/2005 | Sharples et al. ................ | 47/39 |

OTHER PUBLICATIONS

Office Action mailed Sep. 21, 2007, cited in related U.S. Appl. No. 11/510,387 (Attached and referred to as Document 1).

* cited by examiner

*Primary Examiner*—T. Nguyen
(74) *Attorney, Agent, or Firm*—Workman Nydegger (57) ABSTRACT

A planter is fabricated to be suspended from a wall, window, or other partition. The planter generally includes a planter element for holding a flower or plant, a planter casing which supports the planter element, and a suspension member for mounting the planter to the partition. The planter casing is open on top to allow planter elements to be placed therein, and has perforated sides which allow visual inspection of the contents within the sides. The planter may also have two or more recessed portions in which the planters can be positioned. The recessed portions can be parallel may have a saddlebag appearance. The suspension member may partially separate the recessed portions, and allow some overlap between the recessed portions. Dual-function elements may also be added to provide structural and ornamental features to the planter casing, and may further be selectively added to complement decorative features of the partition. The planter also includes water management with integrated sprinklers and/or drip irrigation bubblers for ease in watering plants housed and displayed in the planter.

20 Claims, 5 Drawing Sheets

PLANTER

CROSS-REFERENCE TO RELATED APPLICATIONS

This application claims the benefit of U.S. Design patent application Ser. No. 29/265,152, filed Aug. 25, 2006, and entitled "PLANTER," which is incorporated herein by reference. This application is also a continuation-in-part of U.S. Utility application Ser. No. 11/510,387, filed Aug. 25, 2006

BACKGROUND OF THE INVENTION

1. The Field of the Invention

The present invention relates to containers for plants and other decorative objects. In particular, the present application relates to containers capable of being mounted on wall or window partitions.

2. The Relevant Technology

Flowers, and other live and artificial plants are increasingly being cultivated for use in both the home and the office, Many workers and home owners find that by selecting certain types of plants, they can exhibit a touch of their individuality, while also creating a personal and friendly atmosphere in the home or the office.

Despite the increased desire to add plants to the home or office, workers and home owners are finding fewer and fewer places to grow or display their plants. As many people migrate to urban centers and to the accompanying apartments or condominiums, they find little floor space to spare. Similarly, the cubicle has become commonplace in the workplace, and placing plants in the work station may limit the workers ability to maximize his or her use of the workspace.

Even where a home owner is not severely limited in floor space or land area in which to display plants and flowers, home owners find it useful to place plants on railings, fences, walls, or other partitions. For example, a deck may extend from a bedroom or other room on a second story, and may be enclosed by a decorative railing. Such decks are frequently small and are only large enough for a couple of chairs to be placed thereon. To add more flare to the space, the home owner may hang planters from the railing. These planters may cover some of the railing, thereby obscuring part of the decorative effect of the railing.

Accordingly, there is a continuing need for new and improved planters which do not reduce floor space, and which provide decorative effects or do not detract from the decorative effect of a wall, railing, fence, window, or other partition.

BRIEF SUMMARY OF THE INVENTION

The present invention relates to containers for flowers, plants, or other decorative objects. In particular, the invention discloses decorative planter casing designed to sit upon or otherwise be attached to a fence, wall, railing, window, or other partition.

In one embodiment of the present invention, a planter casing is designed to hold one or more planters or other decorative objects, and to be mounted upon a partition having a horizontal upper surface which meets two vertical surfaces. The planter casing has a recessed portion, one or more bottom surfaces, and at least one side surface. Accordingly, a planter, flowers, or plants can be placed inside the recessed portion and supported by the bottom surface, while the one or more side surfaces help to keep the planter, flowers, or plants within the recessed portion.

In some embodiments, the planter casing also contains a partition suspension member which is connected to the recessed portion. Where the partition suspension member can have a support surface which is fabricated in such a way as to support the recessed portion on a partition surface.

In another embodiment, the invention relates to a planter casing for mounting one or more flower planters upon a partition, and includes at least two recesses. Each recess can be adapted to hold one or more decorative objects such as flowers within a planter. Each recess can further have a bottom surface and side surfaces. Further, the recesses may overlap. In some embodiments, the first and second recesses overlap near a substantially planar upper frame which is continuous as it encircles the first and second recesses. The upper frame may also be open so as to allow planters to be removably placed within the recesses.

In still another embodiment, a flower planter is provided comprising a casing, a planter element within and supported by the casing, and a suspension member secured to the casing and configured to fasten the casing to a partition. In some embodiments, the casing has a saddle portion which is open on an upper surface and which holds the planter element. Additionally, the sides of the casing can be partially open, thereby allowing a view into the side of the casing. The sides can further be connected to a bottom surface which supports the planter element. In still other embodiments, the casing includes a second saddle which is substantially identical to the first saddle, and which receives a second planter element.

In yet another embodiment, the planter includes water management. More specifically, the planter includes integrated sprinklers and/or drip irrigation bubblers for ease in watering plants housed and displayed in the planter.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to containers for flowers, plants, or other decorative objects. In particular, the invention discloses decorative planter casing designed to sit upon or otherwise be attached to a fence, wall, railing, window, or other partition. In use, the decorative planter casing supports one or more flowers, plants, or other decorative objects on the partition. By holding the decorative objects on a partition, the planter casing elevates the decorative objects from a floor, desk, table, or other horizontal surface, thus saving valuable floor space. In addition, the decorative planter can be adapted with ornamental features. The ornamental features may match similar ornamental features of the partition, or may otherwise provide a decorative effect.

Reference will now be made to the drawings to describe various aspects of exemplary embodiments of the invention. It is to be understood that the drawings are diagrammatic and schematic representations of such exemplary embodiments, and are not necessarily limiting of the present invention, nor are they necessarily drawn to scale. In particular, the length and width of the planter casing are drawn without regard for any particular length or width. Additionally, ornamental features are illustrated without any particular regard for the number or particular style of ornamental features that may be incorporated on the planter casing. No inference should therefore be drawn from the drawings as to the length or width of the planter casing, or to the number of ornamental features to be incorporated.

In the following description, numerous specific details are set forth in order to provide a thorough understanding of the present invention. It will be obvious, however, to one skilled in the art that the present invention may be practiced without these specific details.

Figure 1:
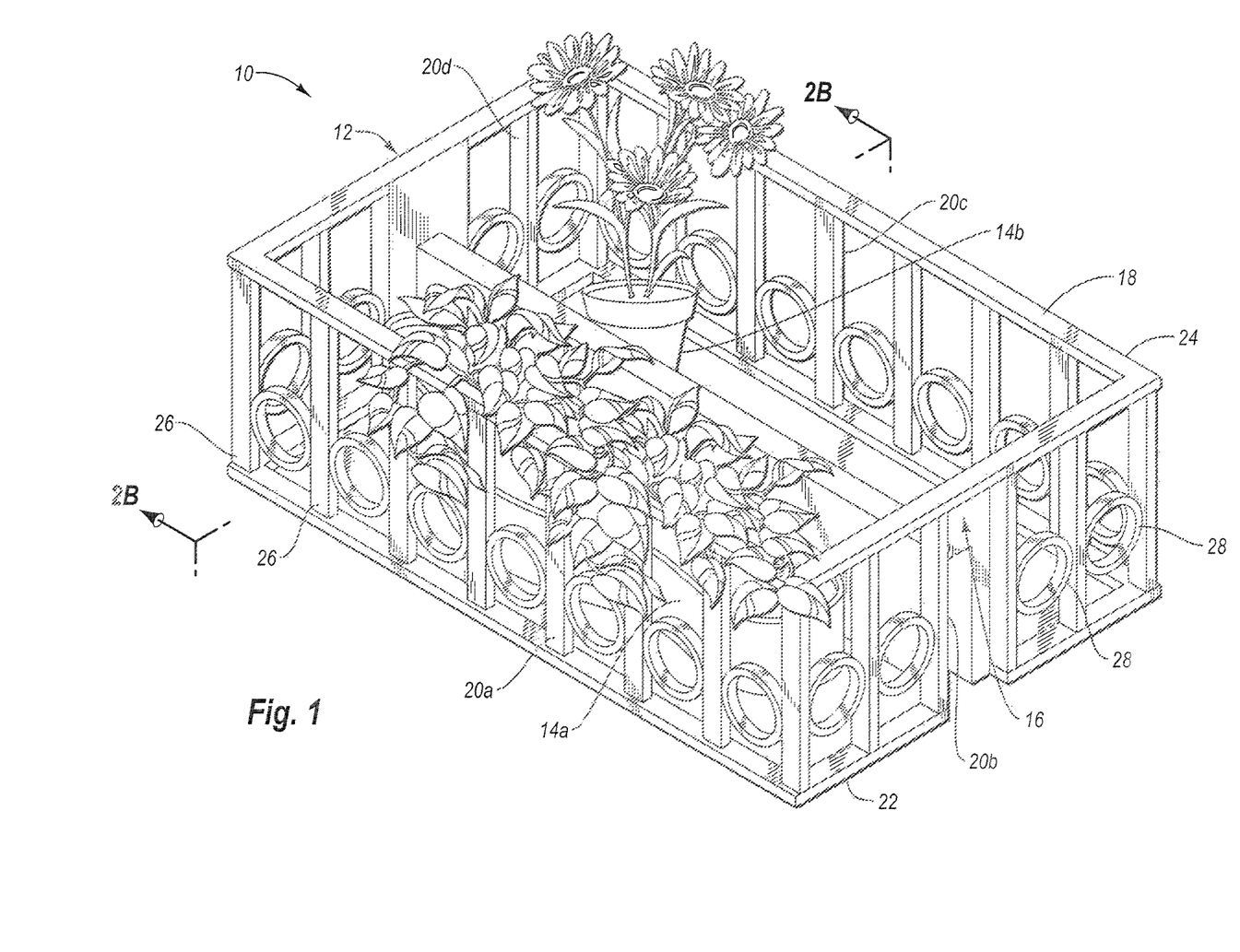
FIG. 1 illustrates a perspective view of a saddlebag planter assembly comprising a planter casing and a plurality of planter elements, according to one embodiment of the invention.

FIG. 1 illustrates an exemplary embodiment of a planter assembly 10 according to an embodiment of the present invention. In this embodiment, planter assembly 10 includes a planter casing 12, one or more planter elements 14a, b and a suspension system 16 for hanging planter assembly 10 on a wall, railing, window, or other partition. Planter casing 12 of FIG. 1 includes a top surface 18, sides 20a-d, and a base 22. One feature of planter casing 12 having top surface 18, sides 20a-d, and base 22, is that planter casing 12 can receive and support planter elements 14a, b. Planter elements 14 can, in turn, hold or contain plants, flowers, or other decorative elements, thereby also allowing planter casing 12 to receive plants, flowers, or other decorative elements. In addition, the combination of planter casing 12 with planter elements 14 provides the ability to quickly and easily replace flowers, plants, or other decorative objects contained in planter assembly 10.

Planter casing 12 can be formed from any conventional materials such as metal, plastic, ceramic, or wood. In some embodiments, and as discussed in more detail hereafter, the material used to make planter casing 12 is the same as, or given the appearance of, a material used in a partition on which planter assembly 10 is suspended. Planter elements 14 can also be formed from any conventional material. For example, planter elements 14 can be formed from metal, wood, plastic, ceramic, terracotta, or organic materials (e.g. peat and wood pulp).

In the illustrated embodiment of planter assembly 10, which includes planter casing 12, sides 20a-d of planter casing 12 are substantially vertical disposed between, and connected to top surface 18 and base 22. In this manner, one or more of sides 20a-d act as means for supporting top surface 18 and base 22, and as means for separating top surface 18 from base 22. Separation between top surface 18 and base 22 is desirable for many reasons. For instance, by separating top surface 18 and base 22, planter casing 12 can be adapted for use as a container. Where the container is at least partially open, such as in the illustrated embodiment, plants, flowers, or other decorative objects held within planter element 14 can be placed therein. Accordingly, planter casing 12 acts as a means for containing and/or supporting a planter element.

Top surface 18 can take on any of a variety of shapes or configurations. In the illustrated embodiment, for example, top surface 18 is defined by a substantially horizontal frame 24. Frame 24 mates with sides 20a-d, and can be connected thereto by any suitable method. For example, depending on the selected material for planter casing 12, welding, adhesives, mechanical fasteners (e.g. nails, screws, clamps, pins, etc.), or any other suitable fastening method can be used to connect sides 20a-d and frame 24. Frame 24 can also be configured to provide access to the interior of planter casing 12. For example, in the embodiment illustrated in FIG. 1, frame 24 has an open interior, such that the interior of top surface 18 is substantially open, while frame 24 extends continuously along sides 20a-d. As will be appreciated by a person having ordinary skill in the art, the illustrated embodiment is exemplary and is not limiting of the present invention. For example, it is contemplated that frame 24 have a plurality of openings providing access into planter casing 12 and/or that frame 24 and top surface 18 do not extend continuously along any or all of sides 20a-d.

Sides 20a-d of planter casing 12 can be formed in any of a variety of ways. For example, sides 20a-d can be solid or perforated. To form solid sides, a solid sheet of material can be used, or interlocking slats can be secured together. Solid sides can provide any of various advantages. For example, where the solid material is substantially leakproof, the planter casing can hold dirt, water, and the like. In this manner, the planter casing can replace one or more planter elements. In other embodiments, such as that depicted in FIG. 1, sides 20a-d are not formed from a solid sheet of material and are perforated. In the illustrated embodiment, for example, sides 20a-d are defined, in part, by a plurality of bars 26. In some embodiments, bars 26 are substantially vertical, while in others they are angled or horizontal.

In the illustrated embodiment, bars 26 are rectangular and laterally spaced, although bars 26 can be any of a variety of suitable sizes and shapes. By laterally spacing bars 26, bars 26 also define openings between the pars, thus creating a perforated appearance to sides 20a-d of planter casing 12. A perforated appearance is also advantageous in some applications. For example, where planter elements 14 may contain decorative features, or themselves may be configured to be decorative. In such cases, the openings in perforated sides 20a-d may allow a person to view the decorative planter element 14.

Additionally, perforated sides 20a-d encourage the use of small flowers or ground covering in planter elements 14 of planter assembly 10. In some embodiments, planter elements may not extend fully between top surface 18 and base 20. In such a case, groundcover and shorter flowers may not extend above top surface 18, or may otherwise be difficult or impossible to view. Open sides 20a-d, however, allow even these smaller flowers or objects to be viewed through the taps between bars 26. As will be discussed in more detail hereafter, sides 20a-d can also include decorative features such as rings 28 or other objects which provide ornamentation or structural strength to sides 20a-d.

Base 22 of planter casing 12 can also be solid or open. In connection with sides 20a-d that are solid, a solid base 22 can facilitate use of planter casing 12 as a planter element. Additionally, even where sides 20a-d are perforated, a solid base 22 may be desirable. For example, suspension system 16 may suspend planter assembly 10 over a floor, sidewalk, street, desk, table, or any other surface. Even where planter element 14 is substantially leakproof, some dirt or water may seep through planter element 14, or wind, rain, or other factors may cause water or dirt to fall from planter element 14. A solid base 22 reduces the risk that the water or dirt will fall through planter casing 12, thereby wetting or dirtying the surface below. Thus, solid base 22 of planter casing 12 reduces the risk of dirt, water, flower petals, and the like falling on people or objects below planter assembly 10, as well as the need to clean the floor or surface over which planter assembly 10 is suspended.

Additionally, where base 22 is not substantially solid, it can increase the stability of planter elements 14. Particularly where planter element 14 is small, slight shifts in the position of planter element 14 on a perforated base having large openings or gaps could cause the planter element to move and shift off-balance, thus increasing the likelihood that planter element 14 will leak (e.g. water or dirt will escape planter element 14). If base 22 is solid and substantially horizontal, slight shifts in position are less likely to result in tipping or leakage.

While a solid base 22 is illustrated, it is also contemplated that base 22 be perforated or semi-perforated. For example, base 22 can be adapted to have an appearance similar to sides 20a-d. Particularly where planter elements 14 are large, or where openings in the base are small, the base is less likely to cause a planter element to teeter and leak. In still other embodiments, base 22 is solid, but further includes a light permeable (e.g. transparent) material. A material such as glass, or a flexible or rigid plastic can reduce leakage to the surface below planter assembly 10 without significant detriment to any ornamental appearance of base 22.

As previously noted, suspension system 16 is configured to suspend planter assembly 10 on a wall, railing, window, fence, and the like. By suspending planter assembly 10, flowers or plants can be elevated from the ground or other surface, thereby adding to the decorative aspects of a space, but without a corresponding reduction in the available floor space. A variety of components may be used to form suspension system 16. For example, a wall bracket, or wire may be secured to frame 24 and attached to a ceiling or wall, or hung on a railing. In other embodiments, and as discussed in more detail hereafter, suspension system 16 can be configured to suspend planter assembly 10 on the top surface of a partition. Still further, a suspension system may include a handle such that it is easily suspended over a surface by a user.

Figure 2A:
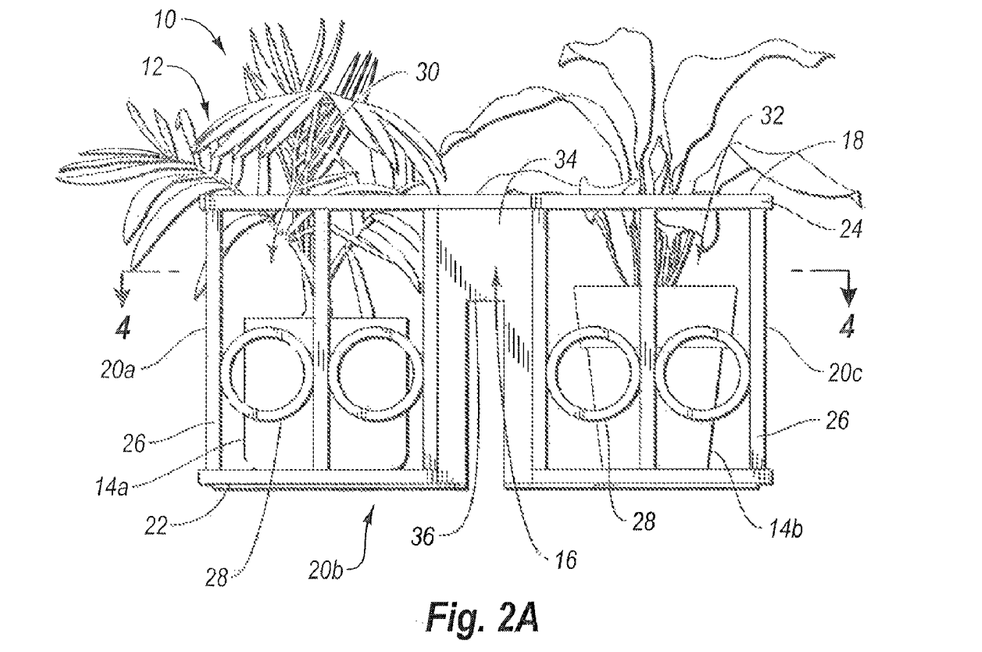
FIG. 2A is a side view of a saddlebag planter casing, according to one embodiment of the present invention.

FIG. 2A illustrates a side view of planter assembly 10 according to one embodiment of the present invention. Planter casing 12 includes a first recessed portion 30. First recessed portion 30 extends between top surface 18 and base 22, thereby acting as a first container in which first planter element 14a can be received and supported. As is also shown in FIG. 1, side 20a defines a first boundary of first recessed portion 30. Additional boundaries of first recessed portion 30 include base 22 and sides 20b, d. Side 20c can form an additional boundary defining first recessed portion 30, or an interior wall may at least partially define the boundary (see, e.g., interior wall 40 in FIG. 2B).

In some embodiments, planter casing 12 can further include a second recessed portion 32. Second recessed portion 32 may, in some embodiments, define a second container. In the illustrated embodiment, second recessed portion 32 defines a second container which is substantially identical to and parallel to the first container, although this feature is not limiting. For instance, in some embodiments, a second container is perpendicular to a first container.

Second recessed portion 32, of the embodiment illustrated in FIG. 2A, is defined, at least in part, by base 22 and sides 20b-d. Additionally, an interior wall (see interior wall 42 in FIG. 2B) may also at least partially define second recessed portion 32. Further, an interior wall may also wholly or partially separate first recessed portion 30 from second recessed portion 32.

As illustrated in FIGS. 1 and 2A, planter assembly 10 comprising planter casing 12 has a saddlebag appearance. In part, this appearance results from first and second recessed portions 30, 32 being substantially identical and parallel. It should be appreciated, however, that although the illustrated embodiment of planter assembly 10 depicts first and second recessed portions 30, 32 as substantially identical and parallel, this is exemplary only and is not necessarily limiting. For example, one or both of first and second recessed portions 30, 32 can be separated to further define additional containers. Alternatively, first and second recessed portions 30, 32 can be different sizes, shapes, or configurations. As will also be appreciated by one having ordinary skill in the art, the illustrated shape of first and second recessed portions 30, 32 is rectangular, but this is not limiting. First and second recessed portions 30, 32 can be rounded, angled, bent, or otherwise configured to give first and second recessed portions 30, 32, and planter casing 12, any suitable shape.

Figure 2B:
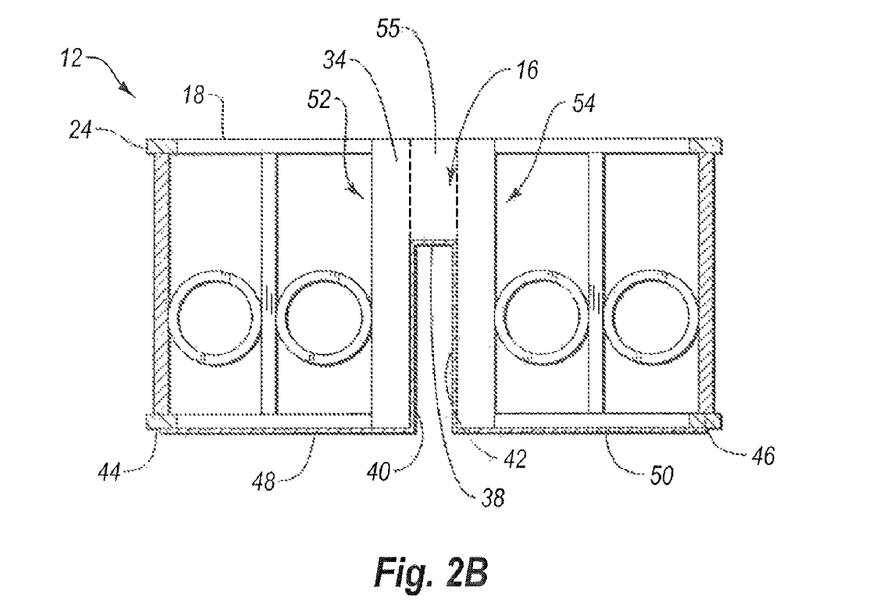
FIG. 2B is a cross-sectional view of the saddlebag planter assembly of FIG. 1.

With reference to FIGS. 2A and 2B, it will be appreciated that the containers defined by first and second recessed portions 30, 32 are at least partially separated by suspension system 16. In this embodiment, suspension system 16 includes support plates 34 disposed on each of sides 20b and 20d. Support plate 34 is fabricated to receive a partition and thereby support planter assembly 10 thereon. For instance, planter assembly 10 can be supported upon a horizontal surface of a partition. In such an embodiment, support plate 34 has a raised support 36. Raised support 36 has a substantially horizontal surface that mates with an adjacent horizontal surface of a partition. Raised support 36 can be sized to be at least as wide as the horizontal surface of the partition. For example, in one embodiment the width of raised support 36 is substantially the same as the width of the partition. In this manner, the partition can be inserted into support plate 34 and can be frictionally secured thereto by raised support 36.

Raised support 36 can be adapted to provide additional stability to planter assembly 10 as it is suspended on a partition. For example, two or more support plates 34, each having raised support 36, can be positioned on each of sides 20b, d. Accordingly, the multiple support plates 34 increase friction and provide added stability.

In still other embodiments, the height of raised support portion 36 provides the function of adding stability to planter assembly 10. For instance, in this embodiment, support plates 34 extend the entire height of planter casing 12, and raised support is about two-thirds the total height of planter casing 12. It will be appreciated, however, that other configurations are contemplated in the practice of the present invention. For example, in some embodiments one or more support plates may not extend the entire height of planter casing 12. In other embodiments, the height of raised support 36 may be more (e.g. three-fourths) or less (e.g. half) than two-thirds the height of planter casing 12.

As a partition is inserted into support plate 34, and planter assembly 10 is supported on the partition, the vertical surfaces of the partition abut the vertical surfaces of raised support 36. Accordingly, the higher the raised support 36, the greater the surface area and frictional engagement between raised support 36 and the partition.

Figure 4:
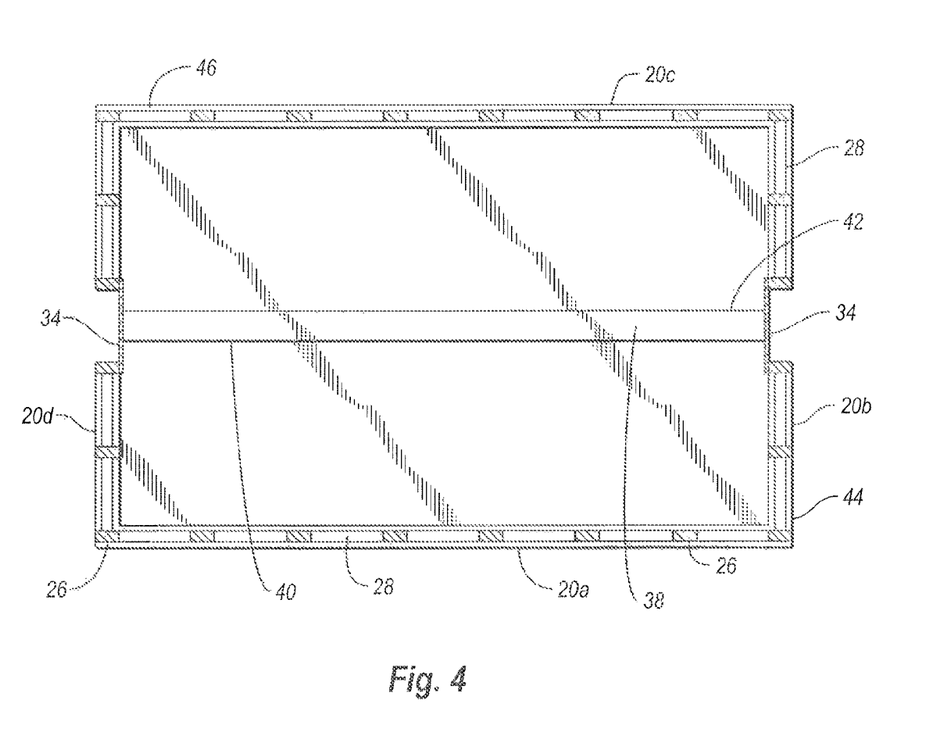
FIG. 4 is a cross-sectional view of a saddlebag planter casing of FIG. 2A.

Raised support 36 of one or more support plates 34 can alone be used to suspend planter assembly 10 on a partition. In other embodiments, however, a support arm 38 can further support planter assembly 10 on the partition. For example, a support arm 38 can be secured to support plates 34, and extend longitudinally along all or a portion of planter casing 12. In this manner, and as is best shown in FIGS. 1 and 4, support arm 38 can extend through a medial portion of planter casing 12. Support arm 38 can increase the contact surface area between planter casing 12 and the partition, thereby increasing the stability of planter assembly 10 and the friction between planter casing 12 and the partition. Support arm 38 and support plates 34 can be made from any suitable material. In some embodiments, support arm 38 and/or support plates 34 are formed of the same material as planter sides 20*a-d*, frame 24, and or base 22. Accordingly, representative materials suitable for use as support arm 38 or support plates 34 include metals, plastics, ceramics, or wood.

The separation between first recessed portion 30 and second recessed portion 32 is further illustrated in FIG. 2B. As illustrated, suspension system 16 is positioned approximately in the middle of planter casing 12, and between first and second recessed portions 30, 32. In this manner, suspension system 16 at least partially separates first recessed portion 30 from second recessed portion. Additionally, raised support 36 and/or support arm 28 can be vertically displaced from, and positioned between top surface 18 and base 22. As will be discussed in more detail with respect to FIG. 4, such a vertical displacement of raised support 36 or support arm 38 allows top surface 18 to be elevated above a top surface of the partition, while base 22 is positioned below the top surface of the partition. Additionally, a first interior wall 40 can be connected to support arm 38. First interior wall extends between support arm 38 and base 22, thereby separating at least a portion of first recessed portion 30 from second recessed portion 32. In some embodiments, a second interior wall 42 also extends from support arm 38 or is otherwise disposed between, and acts to separate, first and second recessed portions 30, 32.

As is also illustrated in FIGS. 1 and 4, interior walls 40, 42 and suspension system 16 may only partially separate first recessed portion 30 and second recessed portion 32. For example, in the illustrated embodiments, interior walls 40, 42 extend only as high as support arm 38. Accordingly, the portions of first and second recessed portions 30, 32 adjacent top surface 18 are not separated. For example, in the illustrated embodiment, portions of first and second recessed portions 30, 32 adjacent frame 24 are not separated by suspension system 16 and/or interior walls 40, 42. In this embodiment, the portions of first and second recessed portions 30, 32 which are not separated define first and second upper portions 52 and 54, respectively. Because first and second upper portions 52, 54 are not separated, and as illustrated in FIGS. 1-2B, first upper portion 52 of first recessed portion 30 is in direct communication with second upper portion 54 of second recessed portion 32. For example, in the exemplary embodiment illustrated in FIG. 2B, the illustrated embodiments of FIGS. 1-2B, first upper portion 52 intersects and overlaps second upper portion 54 in the overlap area 55 which is defined by the illustrated, phantom lines.

It will be appreciated that the heights of first and second upper portions 52, 54 can be varied. For example, in the illustrated embodiment, first and second upper portions 52, 54 have a height of about one-third the total height of planter casing 12. In other embodiments, the height of first and second upper portions 52, 54 is more or less than one-third the height of planter casing 12. Additionally, while the illustrated embodiments depict overlap portion 55 extending the length of planter casing 12, between top surface 18 and arm 38 of suspension system 16, this feature is not necessarily limiting. For example, in some embodiments, an overlap portion extends only partially along the length of planter casing 12 or does not fully extend between top surface 18 and arm 38.

FIG. 2B also illustrates an exemplary embodiment of base 22 in which base 22 comprises first and second bottom frames 44, 46, and first and second bottom plates 48, 50. First and second bottom plates 48, 50 can serve the function of supporting one or more planter elements 14, and thereby maintaining the planter elements 14*a,b* within planter casing 12 and/or stabilizing planter elements 14*a,b*. Bottom frames 44, 46 are, in the illustrated embodiment, secured to bars 26 of sides 20*a-d*, and are thereby linked to, and vertically displaced from, top surface 18. Further, bottom plates 48, 50 can be secured to bottom frames 44, 46 in any suitable method. For example, bottom plates 48, 50 can be welded or mechanically fastened to bottom frames 44, 46.

It will be appreciated that it is not necessary that bottom frames 44, 46 fully surround bottom plates 48, 50. For example, in the embodiment illustrated in FIGS. 2B and 4, bottom frames 44, 46 do not extend along first interior walls 40, 42. Additionally, bottom plates 48, 50, interior walls 40, 42, and raised support 36 can be separately or integrally formed. For example, any elements of base 22 and/or suspension system 16 can be separately formed and bracketed, screwed, welded, or otherwise secured together. In other embodiments, one or more of first and second bottom plates 48, 50, interior walls 40, 42, and raised support 36 are fabricated as one or more integral pieces. For example, bottom plates 48, 50, raised support 36, and interior walls 40, 42 can each be fabricated from sheet metal. The sheet metal can be bent so as to form interior walls 40, 42, bottom plates 48, 50, and/or raised support 36. In other exemplary embodiments, support arm 38 is integrally formed with interior walls 40, 42 and/or support plates 34. Thus, support arm 38, interior walls 40, 42, and bottom plates 48, 50 can be a single integral unit.

As will be appreciated, the configuration of planter assembly 10 and planter casing 12 in FIGS. 2A and 2B is exemplary only, and not necessarily limiting of the present invention. Other configurations of planter assembly 10 and planter casing 12 are contemplated. For example, it is not necessary that support arm 38 be connected to support plates 34, and it is contemplated that support arm 38 and raised support 36 have other configurations. For example, support arm 38 may be elevated or lowered with respect to raised support 36. In a particular example, support arm 38 and raised support 36 may be integrally formed and/or co-planar with top surface 18. Accordingly, top surface 18 can be positioned about planar with the top surface of a partition. In another embodiment, it is contemplated that recessed portions 30, 32 do not overlap, while in still other embodiments, support arm 38 and interior walls 40, 42 are not connected.

Figure 3:
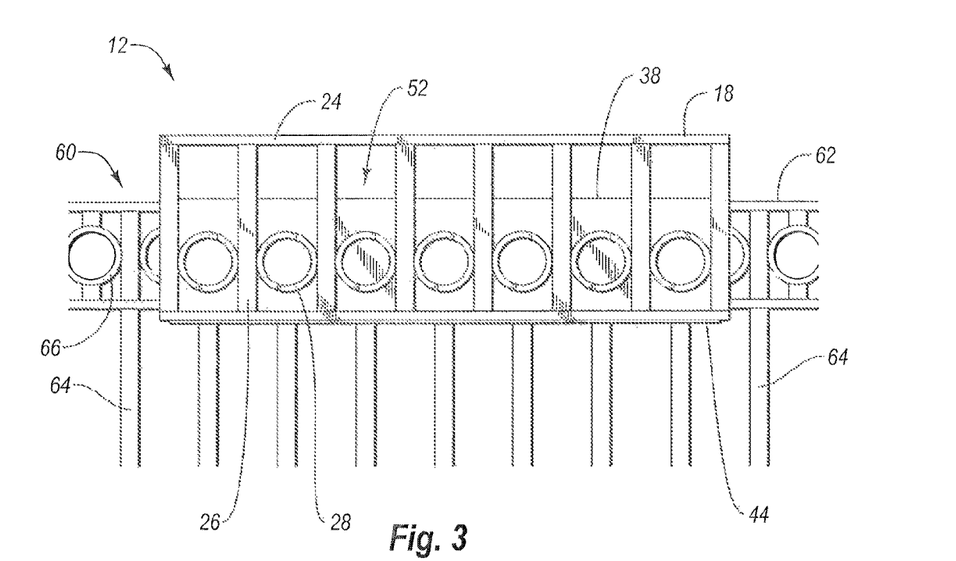
FIG. 3 is a frontal view of a saddlebag planter casing mounted on a decorative fence.

FIG. 3 provides a side view illustrating an exemplary embodiment of planter casing 12 on a partition 60. Partition 60 is exemplary of a number of types of walls, windows, railings, fences, and the like upon which it is contemplated that planter casing 12 can be used.

In the illustrated embodiment, top surface 18 and base 22 of planter casing are vertically spaced above and below, respectively, the horizontal upper surface 62 of partition 60. This position may be accomplished in a number of fashions. For example, as previously described, planter casing 12 can include support arm 38 running longitudinally along a medial section of planter casing 12. Support arm 38 can be positioned adjacent, abut, rest on, and/or be supported by horizontal upper surface 62 of partition 60. In this manner, planter casing 12 fits on, and is stabilized by and on partition 60. As also noted above, this embodiment is exemplary only. Additional methods of stabilizing planter casing 12 on partition 60 are contemplated. For example, a wall bracket, a wire, or a shelf may also be used to elevate planter casing 12 and to secure planter assembly 10 to partition 60. In still other alternatives, a support arm 38 and/or suspension system 16 may not extend through a medial portion of planter casing 12. For example, a support arm may be positioned on one or more sides of a planter casing.

As is also illustrated in FIG. 3, planter casing 12 can be fabricated to have a desired ornamental effect. For instance, in the illustrated embodiment, bars 26 extend between frame 24 and base 22 to provide strength and support to planter casing 12. The shape, size, orientation, or other configuration of bars 26 can also be selected to provide a desired ornamentation, while also maintaining the structural integrity of planter casing 12. In the illustrated embodiment, for example, bars 26 can be painted, tinted, or colored to provide a decorative appearance.

The embodiment illustrated in FIG. 3 further has rings 28 which are secured to bars 26. Rings 28 and bars 26 have an alternating pattern such that each of rings 28 are secured to two of bars 26 positioned on opposite sides of rings 28. It will be appreciated, however, that rings 28 and bars 26 can, however, form any number of patterns. For example, two or more rings 28 may be secured between each of bars 26, or rings 28 may not be positioned between each of bars 26.

Rings 28 also configured to be dual-purpose. Rings 28 are secured to bars 26 and provide additional support to bars 26. For example, rings 28 restrict the lateral movement of bars 26. Further, rings 28 provide a decorative, ornamental effect.

Planter casing 12 can also be adapted to provide ornamentation that complements or otherwise matches partition 60. In the exemplary embodiment illustrated in FIG. 3, planter casing 12 is suspended on partition 60. Partition 60 comprises slats 64 and rings 66. Slats 64 and rings can be adapted to provide a decorative and/or ornamental appearance to partition 60. Decorative slats 64 run in a vertical direction, while decorative rings 66 are positioned in the gaps between decorative slats 64.

In one exemplary embodiment of planter casing 12, bars 26 are selected and/or positioned to match the respective size and positioning of decorative slats 64. For example, in the illustrated embodiment, the width of bars 26 is about equal to the width of slats 64. Further, the lateral spacing between bars 26 is about equal to the lateral spacing between slats 64. Accordingly, the appearance of planter casing 12 having bars 26 complements the similar appearance of partition 60 having slats 64.

In addition, rings 28 of planter casing 12, and may further match or otherwise complement the ornamental configuration of partition 60. In the illustrated embodiment, rings 28 and decorative rings 66 are approximately the same size (e.g. diameter and/or thickness), and are each secured in the lateral spaces between the respective bars 26 and decorative slats 64.

Further, bars 26 and rings 28 can be made of the same material used to manufacture partition 60, can be painted or colored to match partition 60, or can otherwise be configured to match, complement, or blend with the decorative features of partition 60.

It will be appreciated that planter casing 12 is not limited to the use of bars 26 and rings 28 to provide structural and/or ornamental elements to planter casing 12. Of course, diamonds, squares, stars, and the like could also replace bars 26 and/or rings 38. For example, partition 60 may be made of a variety of materials, including wrought iron. Wrought iron is commonly used for fences and railings, and can incorporate a variety of decorative features and accents including, for example, diamonds, stars, leaves, spears, fleur-de-lis, crosses, and the like may be incorporated as decorative and/or supportive features. Any such decorative feature is contemplated in connection with planter casing 12.

In other embodiments, planter casing 12 is comprised of a wood, metal, or plastic material similar to a material used to make partition 60. For example, partition 60 may be a vinyl fence, and planter casing 12 can comprise vinyl or another plastic material adapted to have the appearance of vinyl. However, it is not necessary in all embodiments of the present invention that partition 60 and planter casing 12 be made of the same material, or similar in appearance.

FIG. 4 provides an additional cross-sectional view of planter casing 12 according to another embodiment of the present invention. As illustrated in FIG. 4, bars 26 are aligned in such a way as to match or complement slats 64 of partition 60. For example, in this embodiment, bars 26 have a rectangular cross section, such that the width and length of the rectangular cross-section of bars 26 are different. In the illustrated embodiment, each of bars 26 are about identical, and are positioned and laterally-spaced along sides 20*a*-*d* such that each bar 26 is oriented in the same direction. In this embodiment, the bars 28 are each positioned such that the same dimension (e.g. width or length) of the rectangular cross-section is oriented in the same direction. Such an orientation may be particularly desirable where the width of bar 26 is the configured to match the width of slats or other decorative or support features of a partition 60. In this manner, each bar 26 is configured to complement decorative and/or supportive features of a partition (e.g. decorative slats 64 and partition 60). It will be appreciated, however, that this embodiment is illustrative only, and is not limiting of the present invention. In some embodiments, bars 26 are not identical, or other decorative features may have a variety of orientations and configurations to match or complement partition 60, or to otherwise provide a decorative appearance and quality to planter casing 12. In some embodiments, rods 26 are equally spaced, while in others the spacing is unequal.

FIG. 4 further illustrates an exemplary placement of support plates 34 of suspension system 16. In the illustrated embodiment, support plates 34 are positioned about mid-way between sides 20*a*, *c* and are placed along, and secured to, sides 20*b*, *d*. In this embodiment, support plates 34 are secured to the interior surface of sides 20*b*, *d*, although it will be appreciated that this is exemplary only, and that other positions for support plates 34 are contemplated. For example, support plates 34 may be secured to an exterior surface of sides 20*b*, *d*, or may be located between the interior and exterior surfaces of sides 20*b*, *d*.

Support plates 34 may be secured or fastened to sides 20*b*, *d* by using any suitable method. For example, welds, adhesives, rivets, mechanical fasteners, or other methods may be used. As is further illustrated in FIG. 2B, support plates 34 can further be fastened to frame 24 and/or base 22. In still other embodiments, support plates 34 are integrally formed with all or part of sides 20b, d (e.g. integral with bars 24).

Figure 5:
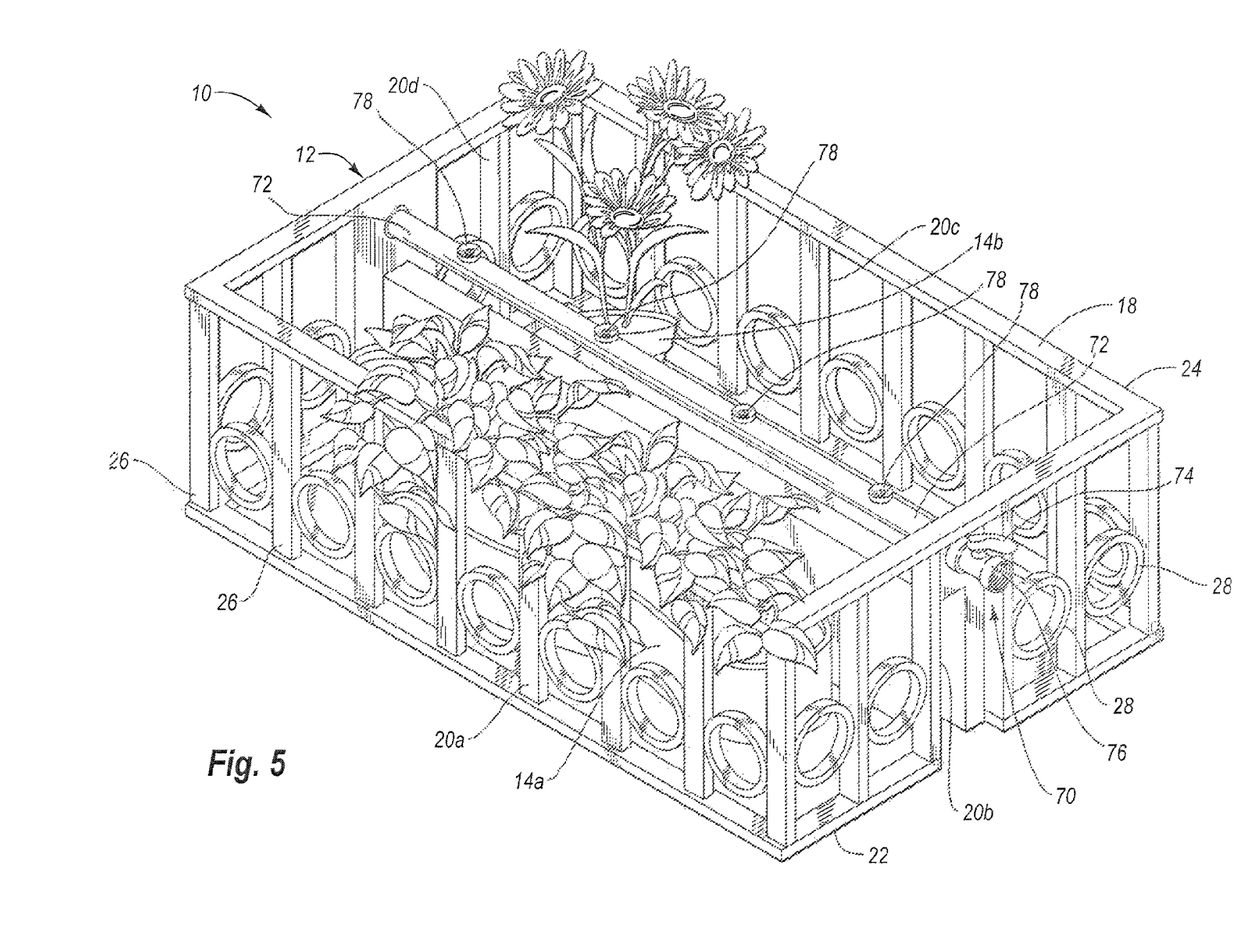
FIG. 5 is a perspective view of a saddlebag planter assembly incorporating a water management assembly.
Figure 6:
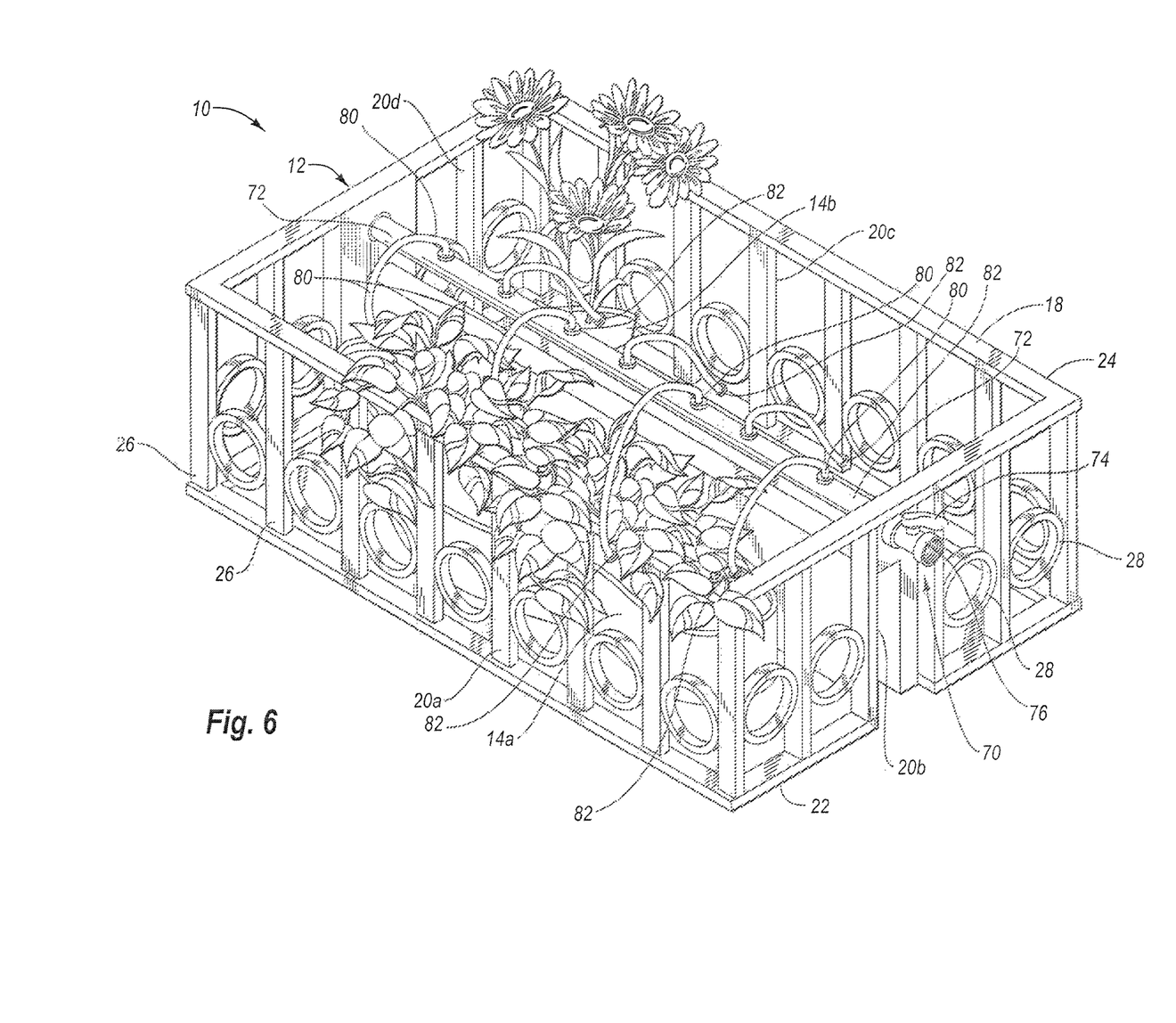
FIG. 6 is a perspective view of a saddlebag planter assembly incorporating another water management assembly.

In yet another embodiment, as illustrated in FIGS. 5 and 6, the invention also includes an integrated water management assembly generally designated at 70. As illustrated, water management assembly 70 is centrally located in the space between first and second recessed portions 30 and 32. Located immediately above raised support 36 and support arm 38 is an elongated water conduit 72, which terminates at one end of planter assembly 10 in a gate valve 74 and female garden hose fitting 76. Although a conventional gate valve 74 and a conventional screw-type garden hose fitting 76 are illustrated in FIGS. 5 and 6, a variety of different valves, connectors and fittings may be used. Valve 74 and fitting 76 are in fluid communication with one another and with the interior of conduit 72, which extends longitudinally the entire length of planter assembly 10. In one embodiment, a plurality of sprinkler heads 78 are located on the upper surface of conduit 72, each being in fluid communication in the interior of conduit 72. When water is supplied to the water management assembly 70 via a conventional garden hose (not shown), and the water turned on, water passes through fitting 76, valve 74, conduit 72 and sprinkler heads 78, thereby providing water to the plants situated within first and second recessed portions 30 and 32. With valve 74 provided as part of planter assembly 10, the water source (not shown) to which the supply hose (not shown) is connected may be left in the "on" position and the flow of water to the planter assembly 10 may be selectively controlled by valve 74. The water management assembly 70 may also include a fixed or variable, in-line pressure regulator (not shown), which is placed in line at some point between fitting 76 and conduit 72, although the placement of the pressure regulator before or after valve 74 is a matter of design choice.

The embodiment shown in FIG. 6 is substantially the same as the embodiment of FIG. 5, except that the sprinkler heads 78 of FIG. 5 are replaced with a plurality of drip irrigation hoses 80, each of which terminates in a drip irrigation bubbler 82, which may be placed directly into the individual planter elements 14a and 14b.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A decorative planter casing designed hold one or more planters, and to be mounted upon an elongate partition having a horizontally oriented top surface and two vertical surfaces, comprising:
    a first recessed portion defining a container and being adapted to receive one or more decorative objects, wherein the container has one or more bottom surfaces and at least one perforated side surface and is located on one side of the partition;
    a second recessed portion defining a container and being adapted to receive one or more decorative objects, wherein the container has one or more bottom surfaces and at least one perforated side surface and is located on the other side of the partition opposite the first recessed portion;
    a partition suspension member interposed between and connecting the first and second recessed portions, wherein the partition suspension member forms an elongate recess configured to receive the partition and has at least one partition support surface configured to rest on the top surface of the partition and to support the first and second recessed portions on opposite sides of the partition; and
    wherein the water management assembly comprises an elongate water conduit positioned above the partition suspension member and the water conduit extends substantially the entire length of the decorative planter casing.

2. A decorative planter casing as recited in claim 1, wherein the water management assembly further comprises a valve in fluid communication with the water conduit.

3. A decorative planter casing as recited in claim 2, wherein the water management assembly further comprises a female hose fitting in fluid communication with the valve and the water conduit.

4. A decorative planter casing as recited in claim 3, wherein the water management assembly further comprises a pressure regulator interposed between and in fluid communication with, the fitting and the conduit.

5. A decorative planter casing as recited in claim 4, wherein the water management assembly further comprises one or more sprinkler heads positioned along the upper surface of, and in fluid communication with the water conduit.

6. A decorative planter casing as recited in claim 4, wherein the water management assembly further comprises one or more drip irrigation hoses spaced along the length of the water conduit, and wherein a first end of each of the one or more drip irrigation hoses is in fluid communication with the water conduit.

7. A decorative planter casing as recited in claim 6, wherein a second end of each of the one or more drip irrigation hoses terminates in a drip irrigation bubbler.

8. A decorative planter casing as recited in claim 1, wherein the first and second recessed portions intersect.

9. A decorative planter casing as recited in claim 1, wherein the second container is substantially identical to the first container.

10. A decorative planter casing as recited in claim 1, further comprising an upper surface connected to the at least one perforated side surface.

11. A decorative planter casing as recited in claim 10, wherein the upper surface is continuous and has a fully unobstructed interior portion configured to allow the one or more decorative objects to be positioned within the container.

12. A decorative planter casing as recited in claim 10, wherein the at least one perforated side surface comprises a plurality of container support members between the upper surface and the one or more bottom surfaces.

13. A decorative planter casing as recited in claim 1, wherein the at least one perforated side surface is four perforated side surfaces.

14. The decorative planter recited in claim 1, wherein the at least one partition support surface is substantially horizontal and is significantly vertically displaced between an upper surface of the recessed portion and the one or more bottom surfaces.

15. The decorative planter recited in claim 14, wherein the partition suspension member has at least one vertical support surface connected to the container.

16. The decorative planter recited in claim 1, wherein the at least one perforated side surface has one or more ornamental elements adapted to complement one or more ornamental elements of the partition.

17. A planter casing for mounting one or more flower planters upon an elongate partition having a horizontally oriented top surface, comprising:
- a first recessed portion adapted to receive one or more decorative objects, wherein the first recessed portion comprises a bottom surface and one or more side surfaces and is located on one side of the partition;
- a second recessed portion adapted to receive one or more decorative objects, the second recessed portion at least partially overlapping the first recessed portion, and wherein the second recessed portion comprises a bottom surface and one or more side surfaces and is located on the other side of the partition opposite the first recessed portion;
- a partition suspension member interposed between and connected to the first and second recessed portions, wherein the partition suspension member forms an elongate recess configured to receive the partition and has at least one partition support surface configured to rest on the horizontally oriented top surface of the partition and to support the first and second recessed portions on opposite sides of the partition; and
- a water management assembly integrated into the partition suspension member comprising
  - an elongate water conduit positioned above the partition suspension member and extending substantially the entire length of the decorative planter casing;
  - a valve in fluid communication with the water conduit;
  - a female hose fitting in fluid communication with the valve and the water conduit;
  - a pressure regulator interposed between and in fluid communication with, the fitting and the conduit.

18. A decorative planter casing as recited in claim 17, wherein the water management assembly further comprises one or more sprinkler heads positioned along the upper surface of, and in fluid communication with the water conduit.

19. A decorative planter casing as recited in claim 17, wherein the water management assembly further comprises one or more drip irrigation hoses spaced along the length of the water conduit, and wherein a first end of each of the one or more drip irrigation hoses is in fluid communication with the water conduit.

20. A decorative planter casing as recited in claim 18, wherein a second end of each of the one or more drip irrigation hoses terminates in a drip irrigation bubbler.

* * * * *